United States Patent
Lawton et al.

(10) Patent No.: US 9,134,635 B1
(45) Date of Patent: Sep. 15, 2015

(54) METHOD FOR CONTINUOUS AGGREGATION OF PRE-TONER PARTICLES

(71) Applicant: XEROX CORPORATION, Norwalk, CT (US)

(72) Inventors: David J. Lawton, Stoney Creek (CA); David T. Borbely, Oakland (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/252,317

(22) Filed: Apr. 14, 2014

(51) Int. Cl.
  G03G 9/087 (2006.01)
  G03G 9/08 (2006.01)
  B01J 19/18 (2006.01)

(52) U.S. Cl.
  CPC .......... *G03G 9/0808* (2013.01); *B01J 19/1812* (2013.01); *B01J 2219/194* (2013.01)

(58) Field of Classification Search
  CPC  G03G 9/0804; G03G 9/08755; G03G 9/0806
  See application file for complete search history.

(56) References Cited

U.S. PATENT DOCUMENTS

| | | | |
|---|---|---|---|
| 3,434,804 A | 3/1969 | Winn | |
| 4,383,093 A | 5/1983 | Shiraki et al. | |
| 4,578,449 A | 3/1986 | Mobley | |
| 5,278,020 A | 1/1994 | Grushkin et al. | |
| 5,290,654 A | 3/1994 | Sacripante et al. | |
| 5,302,486 A | 4/1994 | Patel et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,370,964 A | 12/1994 | Patel et al. | |
| 5,391,456 A | 2/1995 | Patel et al. | |
| 5,403,693 A | 4/1995 | Patel et al. | |
| 5,405,728 A | 4/1995 | Hopper et al. | |

(Continued)

FOREIGN PATENT DOCUMENTS

| | | |
|---|---|---|
| EP | 1 546 240 | 8/2008 |
| EP | 2 487 544 | 8/2012 |

(Continued)

OTHER PUBLICATIONS

Product information sheet for Contherm® Scraped-Surface Heat Exchanger, Tetra Pak, 2003, 2 pages.

(Continued)

*Primary Examiner* — Hoa V Le
(74) *Attorney, Agent, or Firm* — MH2 Technology Law Group LLP

(57) ABSTRACT

A method for the continuous aggregation of pre-toner particles including continuously flowing a slurry that includes at least one resin, and optionally includes other components used in forming aggregated pre-toner particles, or continuously flowing individual dispersions of the components of the slurry, into a reactor. The reactor includes a cylinder with a cylindrical channel, a mixing shaft located in the cylindrical channel, a longitudinal axis of the mixing shaft is substantially parallel to a longitudinal axis of the cylinder, at least one blade that has a plurality of holes is attached to the mixing shaft. The slurry or the dispersions are continuously mixed to form aggregated pre-toner particles.

20 Claims, 4 Drawing Sheets

(56) References Cited

U.S. PATENT DOCUMENTS

| | | |
|---|---|---|
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,622,806 A | 4/1997 | Veregin et al. |
| 5,650,255 A | 7/1997 | Ng et al. |
| 5,650,256 A | 7/1997 | Veregin et al. |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,818 A | 6/1998 | Smith et al. |
| 5,804,349 A | 9/1998 | Ong et al. |
| 5,827,633 A | 10/1998 | Ong et al. |
| 5,840,462 A | 11/1998 | Foucher et al. |
| 5,853,944 A | 12/1998 | Foucher et al. |
| 5,863,698 A | 1/1999 | Patel et al. |
| 5,869,215 A | 2/1999 | Ong et al. |
| 5,869,216 A | 2/1999 | Ong et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 5,994,020 A | 11/1999 | Patel et al. |
| 6,063,827 A | 5/2000 | Sacripante et al. |
| 6,413,692 B1 | 7/2002 | Cheng |
| 6,593,049 B1 | 7/2003 | Veregin et al. |
| 6,756,176 B2 | 6/2004 | Stegamat et al. |
| 6,780,559 B2 | 8/2004 | Veregin et al. |
| 6,830,860 B2 | 12/2004 | Sacripante et al. |
| 7,037,633 B2 | 5/2006 | Hopper et al. |
| 7,097,954 B2 | 8/2006 | Hawkins et al. |
| 7,320,851 B2 | 1/2008 | Zhou et al. |
| 7,524,602 B2 | 4/2009 | Vanbesien et al. |
| 7,799,502 B2 | 9/2010 | Patel et al. |
| 7,851,549 B2 | 12/2010 | Sacripante et al. |
| 8,092,973 B2 | 1/2012 | Lai et al. |
| 8,148,477 B2 | 4/2012 | Saita et al. |
| 8,211,600 B2 | 7/2012 | Vanbesien et al. |
| 8,221,948 B2 | 7/2012 | Zhou et al. |
| 8,227,159 B1 | 7/2012 | Veregin et al. |
| 8,236,471 B2 | 8/2012 | Takagi et al. |
| 8,293,181 B2 | 10/2012 | Saita et al. |
| 8,389,191 B2 | 3/2013 | Vanbesien et al. |
| 8,426,099 B2 | 4/2013 | Nakajima et al. |
| 8,663,886 B2 | 3/2014 | Vanbesien et al. |
| 2006/0160012 A1* | 7/2006 | Hirose et al. ............ 430/137.14 |
| 2006/0222991 A1 | 10/2006 | Sacripante et al. |
| 2009/0036603 A1 | 2/2009 | Saita et al. |
| 2012/0183898 A1 | 7/2012 | Faucher et al. |
| 2012/0208122 A1* | 8/2012 | Faucher et al. ......... 430/137.11 |
| 2012/0208123 A1 | 8/2012 | Faucher et al. |
| 2013/0059249 A1 | 3/2013 | Watanabe et al. |
| 2013/0260305 A1 | 10/2013 | Vanbesien et al. |
| 2013/0323635 A1 | 12/2013 | Ojima |

FOREIGN PATENT DOCUMENTS

| | | |
|---|---|---|
| JP | A-2005-296894 | 10/2005 |
| JP | A-2008-069266 | 3/2008 |

OTHER PUBLICATIONS

Product information sheet for Contherm® Core Scraped-Surface Heat Exchanger, Alfa Laval, 2008, 3 pages.

* cited by examiner

METHOD FOR CONTINUOUS AGGREGATION OF PRE-TONER PARTICLES

BACKGROUND

Emulsion-aggregation (EA) toners are currently produced in a batch process in both laboratory and manufacturing scales. Batch processing can take many hours to complete. In addition, the reactors needed for batch processing may require a great amount of space. This results in a space-time yield, defined as the amount of particles produced/volume of reactor/time, that is relatively low when compared with most chemical processes. This is because the majority of the production time is spent heating the batch to the desired temperature set-points because of the reduction in heat transfer efficiency as scale increases.

The evolution of previous continuous EA reactor designs began with tubular, plug-flow reactors without any active agitation. These reactors were simple tubing in which a homogenized slurry was pumped through and heated. The resulting toner particles obtained showed very poor particle size distributions and were unable to produce a particle even remotely comparable to batch-produced toner. The nature of the aggregation mechanism in EA (orthokinetic flocculation) requires shear input in order to control particle size and prevent coarse formation. The lack of agitation in truly plug-flow reactors thereby inherently limits their performance without the addition of static mixers. Static mixers however, have the disadvantage of coupling the shear-rate, or mixing action, on the flow rate of the slurry; something that is undesirable from a process control standpoint.

However, efforts to carry out EA in a continuous process have shown space-time yields in an order of a magnitude higher than batch processing, but generally, as discussed above, at the expense of toner performance. Generally, the poor performance is due to poor toner particle size distribution. Poor particle size distribution is mainly due to the difficulty in mixing the viscous EA slurry during aggregation due to its high yield-stress. So called "dead-zones" created by poor mixing tend to broaden the particle size distribution and degrade the quality of toner produced.

In addition to toner performance, the complexity and scalability of the design of the reactor has also been an issue. Therefore, a need exists for a reactor design that produces a toner that is comparable a toner produced from batch processing, and is simple to operate, scale-up, fabricate, and maintain.

More current attempts at continuous aggregation have focused on utilizing a series of continuously stirred tank reactors. One such process is described in U.S. Patent Application Publication No. 2012/0183898, filed on Jan. 18, 2011, the entire disclosure of which is incorporated herein by reference. However, further improvement is still desired.

The method described herein overcomes the above described deficiencies, as well as many others, by providing a method for the aggregation of pre-toner particles utilizing homogenous mixing in a plug-flow manner. The method utilizes, for example, an Agitated Reactor Column (ARC) that is, for example, tubular in design yet provides homogenous mixing throughout its length by means of a perforated plate-type impeller. The ARC may be a single ARC, or may be two or more ARCs connected in series, for example, to aggregate both the core of the pre-toner particle and the shell independently. The method has the advantage of, for example, being scalable, easy to fabricate, and easy to operate.

SUMMARY

Described herein is a method for the continuous aggregation of pre-toner particles, the method comprising continuously flowing a slurry that comprises at least one component that includes at least one resin, and optionally further includes at least one wax, at least one colorant, at least one buffer, at least one chelating agent, at least one coagulant, and/or at least one surfactant, or continuously flowing individual dispersions of the components of the slurry, into at least a first reactor comprising a cylinder, wherein the cylinder has a cylindrical channel, wherein the cylindrical channel has an inner wall; a mixing shaft located in the cylindrical channel, wherein a longitudinal axis of the mixing shaft is substantially parallel to a longitudinal axis of the cylinder; and at least one blade attached directly to the mixing shaft, wherein the at least one blade has a plurality of holes, and continuously mixing the slurry or the individual dispersions of the components of the slurry, in the reactor to form aggregated pre-toner particles; and continuously collecting the aggregated pre-toner particles.

Also described herein is a process for the continuous production of emulsion aggregated pre-toner particles, the process comprising continuously feeding a slurry comprising at least one resin into at least one agitated plug-flow reactor comprising at least one entry point, at least one exit point, and an impeller comprising at least one perforated blade; continuously aggregating the slurry in the at least one agitated plug-flow reactor to form aggregated particles; and continuously withdrawing from the at least one exit point of the at least one agitated plug-flow reactor a stream that comprises the aggregated particles, wherein the average particle size of the aggregated particles is about one to about four orders of magnitude greater than the average particle size of the feed dispersion.

A method for the continuous aggregation of pre-toner particles is also described, the method comprising continuously flowing a slurry that comprises at least one component that includes at least one resin, or continuously flowing individual dispersions of the components of the slurry, into at an input end of least one reactor comprising a hollow tube, wherein the hollow tube has a cylindrical inner wall; a length of the tube is greater than a diameter of the tube; a mixing shaft, wherein the mixing shaft is concentric with the hollow tube, a longitudinal axis of the mixing shaft is parallel to a longitudinal axis of the hollow tube, and the mixing shaft is rotatable about the longitudinal axis of the mixing shaft, a least one perforated blade, wherein the at least one perforated blade is attached to the mixing shaft, and the at least one perforated blade extends radially from the mixing shaft toward the inner wall of the tube, continuously rotating the mixing shaft in the at least one reactor to continuously at least partially aggregate the mixture into at least partially aggregated pre-toner particles; and continuously flowing the at least partially aggregated pre-toner particles out of the at least one reactor through an output end of the at least one reactor.

EMBODIMENTS

Figure 1:
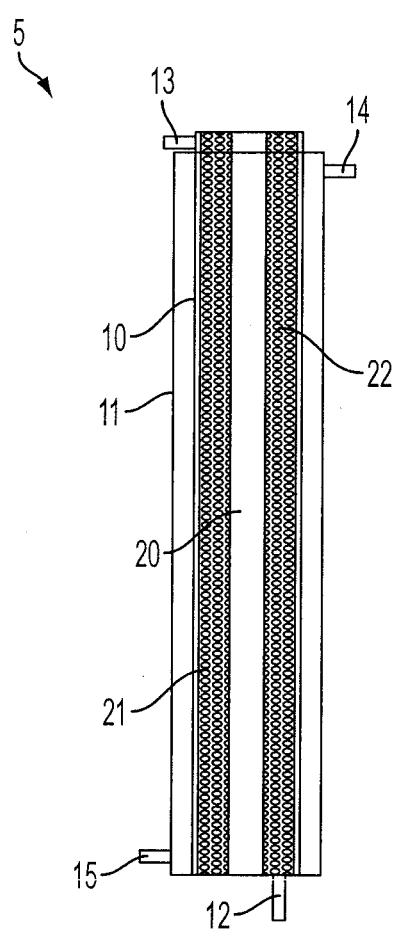
FIG. 1 is a schematic of an embodiment of an agitated reactor column.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The method for the aggregation of pre-toner particles described herein utilizes a hybrid agitated/plug-flow reactor which is tubular in construction while containing a perforated impeller. This promotes on-plane mixing, for example, where convection is on the plane orthogonal to the axis, while minimizing axial mixing, for example, mixing that convects parallel to the axis, also called back-mixing.

Utilizing a hybrid agitated/plug-flow reactor that is tubular in construction and contains a perforated impeller allows for the continuous production of emulsion-aggregation (EA) toner particles. For example, the method described herein is able to fully aggregate the core particles from a slurry that comprises, for example, at least one resin, and may contain other optional components used in forming EA toners, such as, for example, at least one wax, at least one colorant, at least one buffer, at least one chelating agent, at least one coagulant, and/or at least one surfactant, to the point of shell addition with a residence time of the slurry in the reactor of about 2 to about 60 minutes, about 3 to about 30 minutes, about 5 to about 25 minutes, or from about 10 to about 20 minutes, and can shell aggregate to the point of freeze in a similar residence time of about 2 to about 60 minutes, about 3 to about 30 minutes, or from about 4 to about 20 minutes. In addition, the space time yield to fully aggregate the core of the pre-toner particle is about 0.1 g/L/hr to about 3,000 g/L/hr, from about 0.2 g/L/hr to about 2,500 g/L/hr, or from about 0.3 g/L/hr to about 2,000 g/L/hr. More specifically, the space time yield to fully aggregate the core of the pre-toner particle may be about 700 g/L/hr to about 1,000 g/L/hr. Fully aggregate, refers, for example, to a pre-toner particle that has reached a predetermined desired pre-toner particle size, but a shell that surrounds the fully aggregated particle has not been added thereto. The space time yield for complete aggregation, meaning the production of pre-toner particles with a core and a shell, is about 0.5 g/L/hr to about 2500 g/L/hr, about 1 g/L/hr to about 2000 g/L/hr, or from about 2 g/L/hr to about 1500 g/L/hr. More specifically, the space time yield for complete aggregation is about 500 g/L/hr to about 800 g/L/hr.

Space time yield refers, for example, to the mass of a product P formed, per total reactor volume used, per total residence time in the total reactor volume. The following formula is used to determine the space time yield:

$$\sigma_p = m_p/Vt$$

wherein $m_p$ is the mass of the dry toner (product), V is the total reactor volume and t is total reactor residence time.

The average particle size of the aggregated particles may be at least about one order of magnitude greater than the average particle size of the particles in the slurry. For example, the average particle size of the aggregated particles may range from about one to about four orders of magnitude, about one to about three, or about one to about two orders of magnitude greater than the average particle size of the particles in the slurry. For example, the $D_{50}$ average particle size may be about 1 to 1,000, for example, about 10 to about 800, or about 100 to about 600, times larger than $D_{50}$ average particle size of the particles in the slurry, and/or the particles in the individual dispersions of the components of the slurry entering the reactor. The slurry may have an average particle size, for example, in the order of nanometers, for example, from about 10 nm to about 999 nm, about 50 nm to about 800 nm, or from about 100 nm to about 500 nm. The average particle size of the aggregated particles may be due to flocculation of the aggregated particles.

The slurry that is flowed into the reactor may be homogenized before flowing the slurry into the reactor. In the other words, the slurry flowing into the reactor may be a homogenous slurry of at least one resin and other optional components used in forming EA toners. Alternatively, the slurry that is flowed into the reactor may be a nonhomogeneous mixture of at least one resin and other optional components used in forming EA toners. In addition, the individual components of the slurry may be formed into individual dispersions, and each individual dispersion may be individually and simultaneously continuously flowed into the reactor. When flowing a nonhomogeneous mixture or the dispersions of individual components into the reactor, the nonhomogeneous mixture and/or the individual components are homogenized and aggregated in the reactor.

FIG. 1 shows a schematic of an example of an ARC. This design is more similar to an extruder (without pumping action) than a stirred-tank reactor.

With reference to FIG. 1, the reactor 5 is generally tubular or cylindrical in design with a hollow center. However, the outer design of the reactor may be any shape, whereas the hollow center is generally circular or cylindrical in design. The length of the tube is generally greater than the diameter of the tube, such that the length aspect ratio (length/diameter) of the tube is about 5 to about 50, for example, from about 8 to about 40, or from about 10 to about 30. One end of the reactor may be sealed, and the opposite end of the reactor may be open, for example, to mount a drive for rotating the mixing shaft, more fully described below. In addition, one end of the reactor may be an input end, containing, for example, at least one entry point, wherein materials may be inputted into the reactor, and the opposite end of the reactor may be an output end, containing, for example, at least one exit point, wherein the material inputted into the reactor exits the reactor. For example, the reactor may have an inlet port 12 as an entry point and an outlet port 13 as an output point.

The center of the reactor is hollow such that the reactor has an inner interior wall 10 and an outer exterior wall 11. The space between the inner wall of the reactor and the outer wall of the reactor may be solid or hollow. Having a hollow space between the inner wall and the outer wall of the reactor allows, for example, a heating or cooling fluid to be injected into the hollow space to heat or cool the contents contained in the hollow center of the reactor. In this type of a design, a second set of inlet 14 and outlet 15 ports may be a part of the reactor. As an addition to the hollow space, or as an alternative to the hollow space, the reactor may be surrounded by a jacket. The heating or cooling fluid is injected into the jacket that surrounds the reactor. The temperature in the jacket is regulated to control the heating or cooling of the fluid in the reactor. The reactor may also be at least partially submerged in a temperature controlled bath to control the temperature to heat or cool the contents in the reactor. In other words, the heating or cooling of the reactor may be controlled by applying any suitable external heating or cooling source.

The heating or cooling fluid that may be injected into the hollow space and/or the jacket surrounding the reactor may be any temperature necessary to heat or cool the contents of the reactor to a desired temperature. For example, the fluid that is injected into the hollow space and/or the jacket surrounding the reactor may be at a temperature ranging from about 10° C. to about 100° C., from about 20° C. to about 80° C., or from about 30° C. to about 70° C., such as, from about 40° C. to about 60° C. The fluid that may be injected into the hollow space and/or the jacket may be any fluid or mixtures of fluid that is able to flow through the hollow space and/or the jacket such as, for example, water, glycol, or mixtures thereof.

The reactor may be made of any material, for example, stainless steel, that allows for an efficient transfer of heat to the inside of the reactor, and that does not react with the components in the reactor.

Located in the hollow center of the reactor is a mixing shaft 20. The mixing shaft may be inserted into the reactor through the open end of the reactor. The mixing shaft is designed such that the length of the mixing shaft is generally greater than the width or diameter of the shaft. The mixing shaft may be of any shape or design and have any number of sides. For example, the mixing shaft may have, for example, at least three sides, at least four sides, at least five sides, or at least six sides. The shape of the mixing shaft may be, for example, circular, ovular, triangular, square, rectangular, pentagonal, hexagonal, or octagonal. The diameter or width of the mixing shaft is about 5% to about 95% of the diameter of the inner wall. For example, the diameter or width of the mixing shaft may be about 10% to about 85% of the diameter of the inner wall of the reactor, or may be about 20% to about 75% of the diameter of the inner wall of the reactor. More specifically, the diameter or width of the mixing shaft may be about 25% to about 75% of the diameter of the inner wall of the reactor, such as about 33% to about 66% of the diameter of the inner wall of the reactor, or the diameter or width of the mixing shaft may be about 50% to about 95% of the diameter of the inner wall of the reactor, such as about 55% to about 75% of the diameter of the inner wall of the reactor.

The ends of the mixing shaft may extend beyond the ends of the reactor. For example, if both ends of the reactor are open, the mixing shaft may extend beyond both ends. However, if only one end of the reactor is open, only one end of the mixing shaft may extend beyond the open end of the reactor. The end(s) of the mixing shaft may be inserted into a drive or motor to rotate the mixing shaft. The end of the mixing shaft which is not attached to a drive or motor may also be encased in a mechanical seal with a bearing to minimize friction. The end of the mixing shaft which is not attached to a drive or motor may also be installed into a bushing to maintain alignment during rotation.

Attached to the mixing shaft is at least one blade 21. The attachment of the at least one blade to the mixing shaft forms the impeller. For example, the at least one blade may be directly attached to the mixing shaft. The at least one blade extends from the mixing shaft in a radial direction from the mixing shaft towards the inner wall of the reactor. The at least one blade may extend so that it may abut the inner wall of the reactor, but does not contact the inner wall of the reactor. The at least one blade may extend from the mixing shaft in the radial direction towards the inner wall of the reactor for a length that is at least about 50% of a radius of the wall in the radial direction, for example, about 50% to about 99% of the radius of the inner reactor wall, about 60% to about 90% of the radius of the inner wall of the reactor, or about 70% to about 80% of the radius of the inner wall of the reactor. Alternatively, the at least one impeller may make contact with the inner wall of the reactor, and may, for example, scrape the surface of the inner wall of the reactor. The ratio of length of the blade to the reactor wall, or the distance from the tip of the blade to the reactor wall, is dependent on the viscosity of the fluid being mixed, and one of ordinary skill understands how to balance these concerns.

Figure 2:
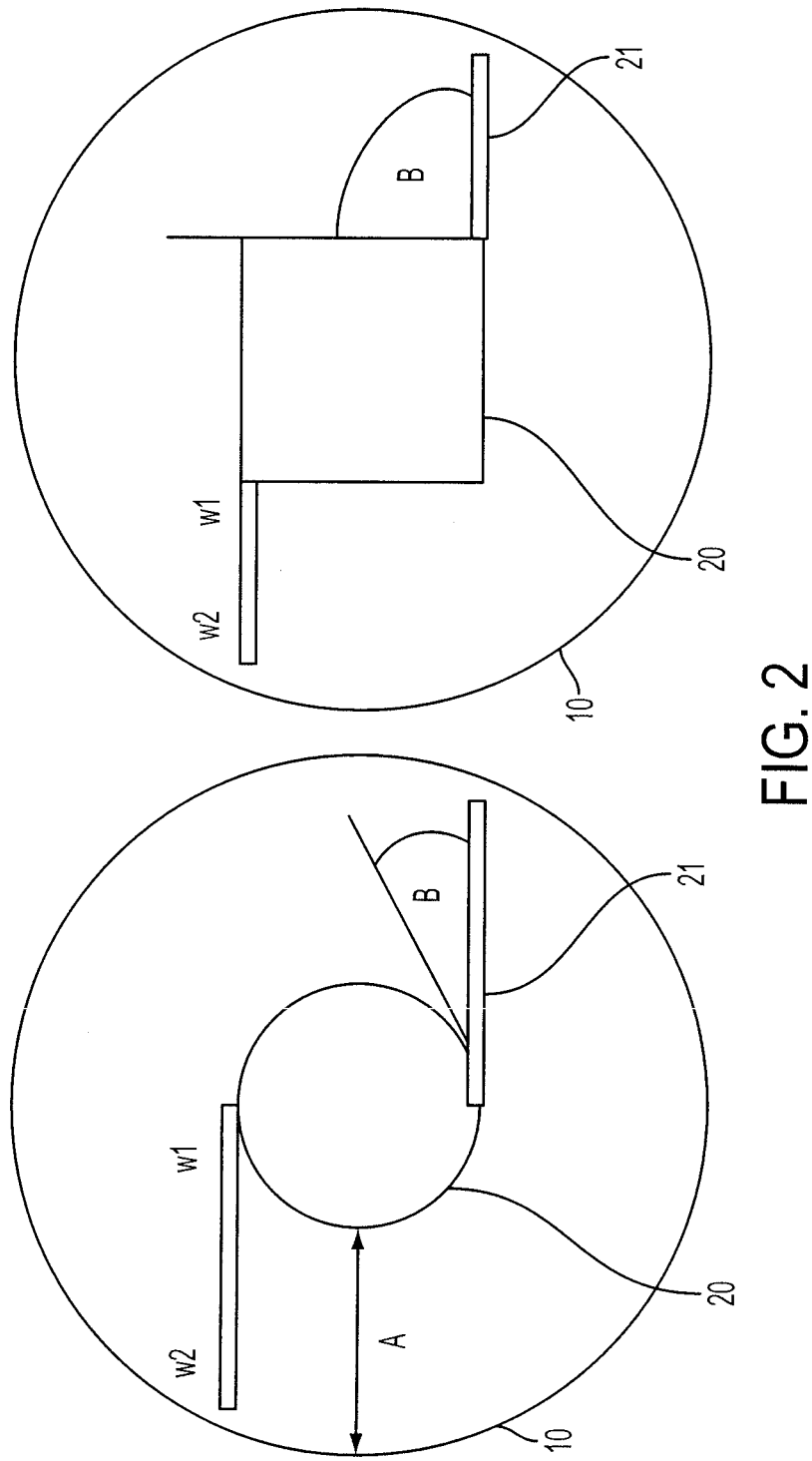
FIG. 2 is a top-down view of the reactor.

The at least one blade may be attached to the mixing shaft such that the at least one blade is offset. Offset refers, for example, to a plane in which the face of the blade is located does not intersect the access of rotation. For example, a single blade may be offset in that the plane formed by the face of the blade is not coincident with the axis of rotation. If there is more than one blade attached to the mixing shaft, the blades may be mounted to the mixing shaft such that the blades are offset from each other. For example, if there are two blades, one blade may be mounted such that it is in a more forward position in the rotational direction than the other blade, as depicted in FIG. 2. Alternatively, if there are two blades, the blades may be mounted to the mixing shaft such that the blades are mounted in the substantially same plane. If there are three or more blades, the blades may be mounted to the mixing shaft such that the spacing between each blade is substantially the same. Alternatively, if there are three or more blades, the spacing between each blade may be different.

The at least one blade may extend along a substantial length of the mixing shaft in the longitudinal direction. Substantial length refers, for example, to a length of the mixing shaft in which more of the shaft is connected to an blade than is not. An example of substantial length is depicted in FIG. 1. Having the at least one blade extend along a substantial length of the mixing shaft ensures homogenous mixing throughout the length of the reactor. In addition, as shown in FIG. 1, the at least one blade may continuously extend along a substantial length of the mixing shaft. Alternatively, the at least one blade may extend discontinuously along the mixing shaft.

The at least one blade also contains holes 22, meaning that, the at least one blade is perforated. The at least one blade may be, for example, substantially perforated. Substantially perforated refers, for example, to blades in which more of the blade is perforated than is not perforated. In addition, the perforations may be distributed evenly along the at least one blade so that the perforations are not clustered in a specific area of the blade. Alternatively, the concentration of perforations in the at least one blade may be different along the axis of rotation such that the concentration of perforations at the input end differs from the concentration of perforations at the output end. For example, the concentration of perforations may be more concentrated near the input end and may become less concentrated along the axis of rotation towards the output end.

FIG. 2 is a top-down view of two different reactors with different shapes of mixing shafts. In FIG. 2, (w1) is the point at which the blade 21 is attached to the mixing shaft and (w2) is the end of the blade 21 that is not attached to the mixing shaft. Having a diameter or width of the mixing shaft in the ranges described above maintains a low ratio of relative angular velocities between (w1), where the blade is mated to the mixing shaft, and the tip of the blade (w2). In other words, a more homogenous shear-rate in the radial direction is achieved.

The mixing shaft is positioned such that it can rotate about the longitudinal axis of the mixing shaft. For example, the axis of rotation of the mixing shaft may be located in the center of the reactor, for example, at a point that is about one-half of the diameter of the inner wall, or at point that is concentric with the inner wall of the reactor. Alternatively, the mixing shaft may have an eccentric axis of rotation relative to a centerline axis of the inner wall. In addition, the longitudinal axis of the mixing shaft is substantially parallel to the longitudinal axis of the reactor. Substantially parallel refers, for example, to the longitudinal axis of the mixing shaft differing from the longitudinal axis of the inner wall of the reactor by no more than about 10°.

The speed at which the mixing shaft is rotated depends on the type of product being produced. One of ordinary skill is be able to determine the speed at which the mixing shaft is rotated in order to produce the specific product desired. For example, in the case of aggregating pre-toner particles, one of ordinary skill knows that a toner slurry has a certain yield-stress (Herschel-bulkley fluid) and if the angular velocity (and hence shear-rate) at (w1) in FIG. 2 is too low, then the slurry will not yield (for example, the slurry may form a semi-solid mass). This causes fouling and is overall undesirable. However, if the rotation of the mixing shaft is increased to increase the shear-rate at (w1) in FIG. 2, then the shear rate at (w2) in FIG. 2 is also increased by the same factor. Increased shear-rate is not always favorable, especially for shear-sensitive fluids, for example, as in an emulsion-aggregated toner. One of ordinary skill knows and understands how to balance these concerns. However, as an example, the speed at which the mixing shaft may be rotated is from about 1 rotation per minute (RPM) to about 10,000 RPM, for example 10 RPM to about 1,000 RPM, or about 100 RPM to about 700 RPM.

In producing an EA toner, two or more reactors may be connected in series. For example, in one reactor, the core of the pre-toner particle is aggregated and in the second reactor, a shell is added to the pre-toner particle. In addition, a plurality of reactors may be connected in series for a higher throughput without increasing the size of any individual reactor. For example, instead of the two reactors, wherein one reactor produces the core of the pre-toner particle and the second reactor adds the shell, four reactors could be connected in series, wherein the first three reactors produce the core, and the fourth reactor adds a shell. For example, the output end of the first reactor would be in fluid connection with the input end of the second reactor, the output end of the second reactor would be in fluid connection with the input end of the third reactor, and the output end of the third reactor would be in fluid connection with the input end of the fourth reactor. Alternatively, a single reactor may be used to aggregate the pre-toner particles and apply a shell thereto.

Although a series of reactors may be connected, for example, in a series similar to a series of continuously-stirred-tank-reactors (CSTR), for example, as described in U.S. Patent Application Publication No. 2012/0183898, the entire disclosure of which is incorporated herein by reference, it is the mixing behavior of the individual reactor(s) described herein that distinguishes the reactor(s) from a CSTR. The reactor design described herein is a hybrid between a CSTR and a plug-flow reactor. That is to say that in the direction of flow between the inlet and outlet of the reactor that is parallel to the axis of mixer rotation, the flow is most representative of a plug-flow reactor in which there is limited back-mixing. The reactor described herein may exhibit localized back-mixing wherein the magnitude of the back-mixing is proportional to the rotational speed of the blade of the impeller. The reactor described herein minimizes the length scales of the back-mixing to ensure that the variance in the residence time distribution is minimized so that each part of the process fluid is retained in the reactor for a similar length of time. A narrow residence time distribution is believed to have a low variance, and results in EA toners with a narrow particle size distribution. For example, the number geometric size distribution (GSDn) of the aggregated pre-toner particles may range from about 1.15 to about 1.5, from about 1.17 to about 1.4, or from about 1.2 to about 1.30.

In a CSTR, the flow behavior of a fluid, for example, a homogenous slurry described above, is only in a plane orthogonal to the axis of rotation. However, in the reactor described herein, the flow of a fluid, for example, a homogenous slurry, is both in a plane orthogonal to the axis of rotation, and is parallel to the axis of rotation.

In order to utilize the at least one reactor to continuously produce aggregated pre-toner particles, the slurry and/or the individual components of the slurry are introduced into the input end of the at least one reactor. The at least one reactor may be heated or cooled to the desired temperature before the slurry and/or the individual components of the slurry are introduced into the reactor, simultaneous with the introduction of the slurry and/or the individual components of the slurry, or after the introduction of the slurry and/or the individual components of the slurry. In order to continuously produce aggregated pre-toner particles, the slurry and/or the individual components of the slurry may be continuously supplied to the at least one reactor.

The rate at which the slurry and/or the individual components of the slurry are supplied to the at least one reactor depends on the desired product to be produced, the volume of the reactor, and the speed at which the mixing shaft is rotated. One of ordinary skill understands how to balance these concerns. However, as an example, the feed rate of the slurry and/or the individual components of the slurry to the input end of the at least one reactor may be from about 1 ml/min to about 1 L/min, about 100 ml/min to about 800 mL/min, or about 200 ml/min to about 600 ml/min.

Before, simultaneous with, or after the introduction of the slurry and/or the individual components of the slurry has begun, the mixing shaft in the reactor is rotated. As discussed above, the speed at which the mixing shaft is rotated depends on the type of product being produced, and one of ordinary skill is be able to determine the speed at which the mixing shaft is rotated in order to produce the specific product desired.

The slurry and/or the individual components of the slurry are at least partially aggregated in the at least one reactor, or may be fully aggregated in the at least one reactor. If the slurry and/or the individual components of the slurry are partially aggregated in the at least one reactor, one or more reactors may be connected in series in order to produce fully aggregated pre-toner particles. For example, the partially aggregated pre-toner particles flow out of the output end of the first reactor and into the input end of the second reactor in order to further aggregate the pre-toner particles. The partially aggregated particles may be fully aggregated in the second reactor, or the further aggregated pre-toner particles may flow out of the output end of the second reactor and into the input end of a third reactor in order to even further aggregate the pre-toner particles, or to fully aggregate the pre-toner particles. Although the above example describes three reactors connected in series, more reactors may be connected in series as needed until the partially aggregated particles are fully aggregated to the predetermined desired particle size. One of ordinary skill understands how to determine when additional reactors are needed to fully aggregate the pre-toner particles.

In addition, if more than one reactor is used to fully aggregate the slurry described above and/or the individual components of the slurry, the shape of, size of, rotation speed of, and/or number of blades attached to the mixing shaft may independently be the same or different in each rector. In addition, each reactor may be independently heated or cooled to the same or different temperature.

Alternatively, the at least partially aggregated pre-toner particles may be further aggregated in a series of continuously-stirred-tank-reactors (CSTRs), for example, as described in U.S. Patent Application Publication No. 2012/0183898, the disclosure of which is hereby incorporated by reference in its entirety, or may be further aggregated in a conventional batch process using a batch reactor, for example, as described in U.S. Pat. Nos. 5,370,963; 5,370,964; 5,391,456; 5,403,693; 6,413,692; and 8,092,973, the disclosures of which are incorporated herein by reference.

After the pre-toner particles have been fully aggregated, the fully aggregated pre-toner particles may be continuously collected in a holding tank for subsequent processing, such as, for example, subsequent coalescence of the fully aggregated pre-toner particles, or the addition of a latex shell to the fully aggregated pre-toner particles. Alternatively, for example, the output end of the reactor in which the pre-toner particles have been fully aggregated may be in fluid connection with the input end of a subsequent reactor, such that the fully aggregated pre-toner particles may continuously flow out of the output end of the reactor and into the input end of the subsequent reactor. Simultaneously, a homogenous mixture of shell latex particles is continuously flowed into the input end of the subsequent reactor. A mixing action caused by a rotation of the mixing shaft in the subsequent reactor causes the homogenous mixture of shell latex particles to form a shell around the fully aggregated pre-toner particles, thus forming completely aggregated, core-shell pre-toner particles in the reactor. The completely aggregated, core-shell pre-toner particles are then flowed out of the output end of the subsequent reactor. Multiple shells may be formed in this manner by subsequent addition and aggregation of subsequent latex materials in a similar manner with a greater number of reactors. For example, there may be two reactors connected in series, each with a different homogenous mixture of shell latex particles supplied to the inlet portion of the reactor. reactor.

The aggregated pre-toner particle slurry may also or additionally be fed into at least one reactor with an additional solution of at least one buffer, and/or at least one chelating agent, and/or at least one pH adjustment solution so that the aggregation is frozen or halted and the particle growth does not continue. These aggregated and frozen pre-toner particles can then be subjected to any additional process to form suitable toner particles, as discussed below.

As discussed above, the aggregated pre-toner particles may then be subjected to any additional processes for the production of toner particles. Additional processes include, for example, optional further aggregation, freezing particle aggregation to stabilize the particle size of the aggregate by stopping it from growing further in size, chelation to remove the aggregating agent if required to increase gloss of the toner for glossy images, coalescence to fuse together the aggregated latex in the pre-toner particles to form a solid integral particle that will be robust to the development process, washing to remove surfactants and ions that may have an effect on toner performance, such as charging, drying to remove water so that the toner can be effectively charged in an electrophotographic development process, and toner blending with surface additives to control the toner surface properties, including charging, flow, elevated temperature blocking, photoreceptor cleaning, blade lubrication and other electrophotographic properties to improve toner performance. The additional processes may be performed by any methods known in the art, for example, as described in U.S. Pat. Nos. 5,278,020; 5,290,654; 5,302,486; 5,308,734; 5,344,738; 5,346,797; 5,348,832; 5,364,729; 5,366,841; 5,370,963; 5,403,693; 5,405,728; 5,418,108; 5,496,676; 5,501,935; 5,527,658; 5,585,215; 5,650,255; 5,650,256; 5,723,253; 5,744,520; 5,763,133; 5,766,818; 5,747,215; 5,804,349; 5,827,633; 5,840,462; 5,853,944; 5,869,215; 5,863,698; 5,902,710; 5,910,387; 5,916,725; 5,919,595; 5,925,488; 5,977,210; 5,994,020; 8,663,886; 8,227,159; and 8,221,948, the disclosures of each are hereby incorporated by reference in their entirety.

Coalescence

Following aggregation to the desired particle size and application of any optional shell, the particles may then be coalesced to the desired final shape. The coalescence may be achieved by any conventional means. For example, in order to coalesce the pre-toner particles to the described shape and/or morphology, the aggregated pre-toner particles may be heated to a temperature from about 45° C. to about 100° C., from about 55° C. to about 99° C., which may be at or above the glass transition temperature of the resins utilized to form the toner particles. The fused particles may be measured for shape factor or circularity, such as with a SYSMEX FPIA 3000 analyzer, until the desired shape is achieved.

Coalescence may be accomplished over a period from about 0.01 to about 9 hours, in embodiments from about 0.1 to about 4 hours.

Subsequent Treatments

After aggregation and/or coalescence, the pH of the mixture may then be lowered to from about 3.5 to about 8 and, in embodiments, to from about 3.7 to about 7 with, for example, an acid, to further coalesce the toner aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

After coalescence, the coalesced toner particles may be cooled, washed and dried. Cooling may be at a temperature of from about 20° C. to about 40° C., or from about 22° C. to about 30° C., over a period of time of from about 1 hour to about 8 hours, or from about 1.5 hours to about 5 hours.

Cooling a coalesced toner slurry may include quenching by adding a cooling media such as, for example, ice, dry ice and the like, to effect rapid cooling to a temperature of from about 20° C. to about 40° C., or from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling is accomplished by discharging the contents of the reactor through a chilled heat exchanger, for example a shell and tube heat exchanger cooled by chilled water.

After cooling, the coalesced toner slurry may then be washed. The washing may be carried out at a pH of from about 7 to about 12, or from about 9 to about 11. The washing may be at a temperature of from about 30° C. to about 70° C., or from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., or from about 45° C. to about 60° C. The drying may be continued until the moisture level of the particles is below a set target, for example, of about 1% by weight, or less than about 0.7% by weight.

Any component and/or material suitable for use in forming pre-toner particles may be utilized in forming the slurry. Examples of components and materials that may be utilized to form the slurry of pre-toner particles are discussed below.

Resins

Any resin may be utilized in forming a latex emulsion of the present disclosure. The resins may be used to form the aggregated pre-toner particles, and may be used to apply a shell thereto. For example, the resins may be an amorphous resin, a crystalline resin, and/or a combination thereof. The resin may be a polyester resin, including the resins described in U.S. Pat. Nos. 6,593,049 and 6,756,176, the disclosures of each of which are hereby incorporated by reference in their entirety. Resins may also include a mixture of an amorphous polyester resin and a crystalline polyester resin as described in U.S. Pat. No. 6,830,860, the disclosure of which is hereby incorporated by reference in its entirety. If the aggregated particle slurry is used for the production of toner, then the average particle size of the formed latex is from about 50 to about 300 nm, from about 100 to about 250 nm, or from about 160 to about 180 nm.

Generally, the latex resin may be composed of a first and a second monomer composition. Any suitable monomer or mixture of monomers may be selected to prepare the first monomer composition and the second monomer composition. The selection of monomer or mixture of monomers for the first monomer composition is independent of that for the second monomer composition and vice versa. In other words, the first and second monomer composition may be the same monomer or different monomers. In the case a mixture of monomers, the resulting latex polymer will be generally be a copolymer.

Monomers for the first and/or the second monomer compositions include, for example, polyesters, styrene, alkyl acrylate, such as, methyl acrylate, ethyl acrylate, butyl arylate, isobutyl acrylate, dodecyl acrylate, n-octyl acrylate, 2-chloroethyl acrylate; β-carboxy ethyl acrylate (β-CEA), phenyl acrylate, methyl alphachloroacrylate, methyl methacrylate, ethyl methacrylate and butyl methacrylate; butadiene; isoprene; methacrylonitrile; acrylonitrile; vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone and methyl isopropenyl ketone; vinylidene halides, such as, vinylidene chloride and vinylidene chlorofluoride; N-vinyl indole; N-vinyl pyrrolidone; methacrylate; acrylic acid; methacrylic acid; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; isobutylene; and the like, and mixtures thereof.

As discussed above, the first monomer composition and the second monomer composition may independently of each other comprise two or three or more different monomers. The resulting latex polymer therefore may comprise a copolymer. The resulting latex copolymer includes, for example, poly(styrene-n-butyl acrylate-β-CEA), poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylonitrile), and the like.

The first monomer composition and the second monomer composition may be substantially water insoluble, for example, the first monomer composition and the second monomer composition may be hydrophobic, and may be dispersed in an aqueous phase with adequate stirring when added to a reaction vessel.

The weight ratio between the first monomer composition and the second monomer composition may be in the range of from about 0.1:99.9 to about 50:50, including from about 0.5:99.5 to about 25:75, or from about 1:99 to about 10:90.

Further examples of the first/second monomer composition may be a mixture comprising styrene and alkyl acrylate, such as, a mixture comprising styrene, n-butyl acrylate and β-CEA. Based on total weight of the monomers, styrene may be present in an amount from about 1% to about 99%, from about 50% to about 95%, from about 70% to about 90%, although may be present in greater or lesser amounts; alkyl acrylate, such as, n-butyl acrylate, may be present in an amount from about 1% to about 99%, from about 5% to about 50%, from about 10% to about 30%, although may be present in greater or lesser amounts.

The resin may also be a polyester resin formed by reacting a diol with a diacid in the presence of an optional catalyst. For forming a crystalline polyester resin, suitable organic diols include, for example, aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent (although amounts outside these ranges can be used), Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, from about 40 to about 60 mole percent, from about 42 to about 52 mole percent, or from about 45 to about 50 mole percent.

The crystalline resin can possess various melting points of, for example, from about 30° C. to about 120° C., or from about 50° C. to about 90° C. The crystalline resin may have a number average molecular weight ($M_n$), as measured by gel permeation chromatography (GPC) of, for example, from about 1,000 to about 50,000, in from about 2,000 to about 25,000, and a weight average molecular weight ($M_w$) of, for example, from about 2,000 to about 100,000, from about 3,000 to about 80,000, as determined by Gel Permeation Chromatography using polystyrene standards. The molecular weight distribution ($M_w/M_n$) of the crystalline resin may be, for example, from about 2 to about 6, or from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, from about 42 to about 52 mole percent of the resin, or from about 45 to about 50 mole percent of the resin. Examples of the alkylene oxide adducts of bisphenol include polyoxypropylene (2.2)-2,2-bis(4-hydroxyphenyl) propane, polyoxypropylene (3.3)-2,2-bis(4-hydroxyphenyl) propane, polyoxyethylene (2.0)-2,2-bis(4-hydroxyphenyl) propane, polyoxyethylene (2.2)-2,2-bis(4-hydroxyphenyl) propane, polyoxypropylene (2.0)-polyoxyethylene (2.0)-2,2-bis(4-hydroxyphenyl) propane, and polyoxypropylene (6)-2,2-bis(4-hydroxyphenyl) propane. These compounds may be used singly or as a combination of two or more thereof.

Examples of additional diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and combinations thereof. The amount of organic diols selected can vary, and may be present, for example, in an amount from about 40 to about 60 mole percent of the resin, from about 42 to about 55 mole percent of the resin, or from about 45 to about 53 mole percent of the resin.

Polycondensation catalysts that may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In addition, a crystalline polyester resin may be contained in the binding resin. The crystalline polyester resin may be synthesized from an acid (dicarboxylic acid) component and an alcohol (diol) component. In what follows, an "acid-derived component" indicates a constituent moiety that was originally an acid component before the synthesis of a polyester resin and an "alcohol-derived component" indicates a constituent moiety that was originally an alcoholic component before the synthesis of the polyester resin.

A "crystalline polyester resin" indicates one that shows not a stepwise endothermic amount variation but a clear endothermic peak in differential scanning calorimetry (DSC). However, a polymer obtained by copolymerizing the crystalline polyester main chain and at least one other component is also called a crystalline polyester if the amount of the other component is 50% by weight or less.

As the acid-derived component, an aliphatic dicarboxylic acid may be utilized, such as a straight chain carboxylic acid. Examples of straight chain carboxylic acids include oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid, as well as lower alkyl esters and acid anhydrides thereof. Among these, acids having 6 to 10 carbon atoms may be desirable for obtaining suitable crystal melting point and charging properties. In order to improve the crystallinity, the straight chain carboxylic acid may be present in an amount of about 95% by mole or more of the acid component and, in embodiments, more than about 98% by mole of the acid component. Other acids are not particularly restricted, and examples thereof include conventionally known divalent carboxylic acids and dihydric alcohols, for example those described in U.S. Patent Application Publication No. 2013/0260305; U.S. Pat. No. 8,389,191; and U.S. Pat. No. 8,211,600, the disclosure of each of which is totally incorporated herein by reference. Specific examples of the monomer components include, as divalent carboxylic acids, dibasic acids such as phthalic acid, isophthalic acid, terephthalic acid, naphthalene-2,6-dicarboxylic acid, naphthalene-2,7-dicarboxylic acid, and cyclohexanedicarboxylic acid, and anhydrides and lower alkyl esters thereof, as well as combinations thereof, and the like.

As the alcohol component, aliphatic dialcohols may be used. Examples thereof include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-dodecanediol, 1,12-undecanediol, 1,13-tridecanediol, 1,14-tetradecanediol, 1,18-octadecanediol and 1,20-eicosanediol. Among them, those having from about 6 to about 10 carbon atoms may be used to obtain desirable crystal melting points and charging properties. In order to raise crystallinity, it may be useful to use the straight chain dialcohols in an amount of about 95% by mole or more, in embodiments about 98% by mole or more.

Examples of other dihydric dialcohols which may be utilized include bisphenol A, hydrogenated bisphenol A, bisphenol A ethylene oxide adduct, bisphenol A propylene oxide adduct, 1,4-cyclohexanediol, 1,4-cyclohexanedimethanol, diethylene glycol, propylene glycol, dipropylene glycol, 1,3-butanediol, neopentyl glycol, combinations thereof, and the like.

For adjusting the acid number and hydroxyl number, the following may be used: monovalent acids such as acetic acid and benzoic acid; monohydric alcohols such as cyclohexanol and benzyl alcohol; benzenetricarboxylic acid, naphthalenetricarboxylic acid, and anhydrides and lower alkylesters thereof; trivalent alcohols such as glycerin, trimethylolethane, trimethylolpropane, pentaerythritol, combinations thereof, and the like.

The crystalline polyester resins may be synthesized from a combination of components selected from the above-mentioned monomer components, by using conventional methods. Methods include, for example, the ester exchange method and the direct polycondensation method, which may be used singularly or in a combination thereof. The molar ratio (acid component/alcohol component) when the acid component and alcohol component are reacted, may vary depending on the reaction conditions. The molar ratio is usually about 1/1 in direct polycondensation. In the ester exchange method, a monomer such as ethylene glycol, neopentyl glycol or cyclohexanedimethanol, which may be distilled away under vacuum, may be used in excess.

As discussed above, an unsaturated amorphous polyester resin may be utilized as a latex resin. Examples of such resins include those disclosed in U.S. Pat. No. 6,063,827, the disclosure of which is hereby incorporated by reference in its entirety. Example unsaturated amorphous polyester resins include poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

Examples of a suitable amorphous resins may include alkoxylated bisphenol A fumarate/terephthalate based polyesters and copolyester resins. For example, a suitable amorphous polyester resin may be a copoly(propoxylated bisphenol A co-fumarate)-copoly(propoxylated bisphenol A co-terephthalate) resin having the following formula (I):

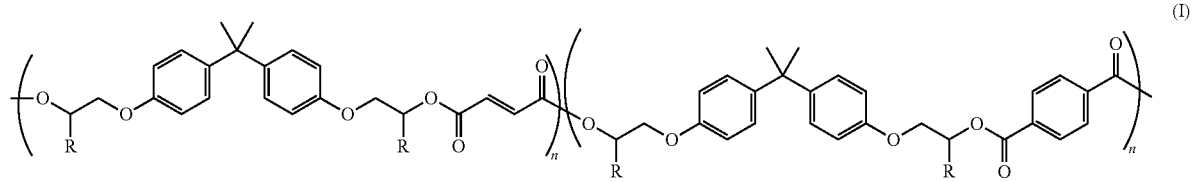

(I)

wherein R may be hydrogen or a methyl group, and m and n represent random units of the copolymer and m may be from about 2 to 10, and n may be from about 2 to 10.

An example of a linear copoly(propoxylated bisphenol A co-fumarate)-copoly(propoxylated bisphenol A co-terephthalate) which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C. and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. Examples, a suitable crystalline resin may include a resin formed of ethylene glycol and a mixture of dodecanedioic acid and fumaric acid co-monomers with the following formula:

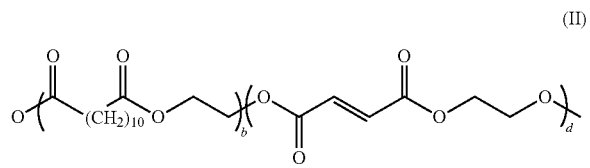

(II)

wherein b is from about 5 to about 2000 and d is from about 5 to about 2000.

For example, a poly(propoxylated bisphenol A co-fumarate) resin of formula (I) as described above may be combined with a crystalline resin of formula (II) to form a latex emulsion.

The amorphous resin may be present, for example, in an amount of from about 30 to about 90 percent by weight of the toner components, or from about 40 to about 80 percent by weight of the toner components. For example, the amorphous resin or combination of amorphous resins utilized in the latex may have a glass transition temperature of from about 30° C. to about 80° C., or from about 35° C. to about 70° C. The combined resins utilized in the latex may have a melt viscosity of from about 10 to about 1,000,000 Pa*S at about 130° C., or from about 50 to about 100,000 Pa*S.

One, two, or more resins may be used. Where two or more resins are used, the resins may be in any suitable ratio, for example, in a weight ratio, such as, for example, of from about 1% (first resin)/99% (second resin) to about 99% (first resin)/1% (second resin), from about 10% (first resin)/90% (second resin) to about 90% (first resin)/10% (second resin), Where the resin includes an amorphous resin and a crystalline resin, the weight ratio of the two resins may be from about 99% (amorphous resin): 1% (crystalline resin), to about 1% (amorphous resin): 99% (crystalline resin).

The resin may possess acid groups which, may be present at the terminal of the resin. Acid groups that may be present include carboxylic acid groups, and the like. The number of carboxylic acid groups may be controlled by adjusting the materials utilized to form the resin and reaction conditions.

For example, the resin may be a polyester resin having an acid number from about 2 mg KOH/g of resin to about 200 mg KOH/g of resin, from about 5 mg KOH/g of resin to about 50 mg KOH/g of resin. The acid containing resin may be dissolved in, for example, a tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

The latex may be prepared, for example, by any conventional phase inversion emulsification process, for example, as described in U.S. Pat. No. 7,851,549, and U.S. Pat. No. 8,236,471, the disclosure of each of which is hereby incorporated by reference in its entirety. For example, phase inversion process generally involves the solubilization of resin and other components, such as, for example, a photoinitiator, in an organic solvent that is immiscible with water, for example, methyl ethyl ketone or ethyl acetate, and a phase inversion organic solvent, such as isopropanol; adding a neutralization agent, for example, ammonium hydroxide; adding water to cause the phase inversion; and removing the organic solvent by, for example, distillation.

Surfactants

Colorants, waxes, and other additives utilized to form toner compositions may be in dispersions including surfactants. Moreover, pre-toner particles may be formed by emulsion aggregation methods where the resin and other components of the toner are placed in one or more surfactants, an emulsion is formed, pre-toner particles are aggregated, coalesced, optionally washed and dried, and recovered. Depending on the emulsion system, any desired nonionic or ionic surfactant such as anionic or cationic surfactant may be contemplated.

One, two, or more surfactants may be utilized. The surfactants may be selected from ionic surfactants and nonionic surfactants. Anionic surfactants and cationic surfactants are encompassed by the term "ionic surfactants." The surfactant may be utilized so that it is present in an amount of from about 0.01% to about 5% by weight of the toner composition, for example from about 0.75% to about 4% by weight of the toner composition, or from about 1% to about 3% by weight of the toner composition.

Anionic surfactants which may be utilized include sulfates and sulfonates, sodium dodecylsulfate (SDS), sodium dodecylbenzene sulfonate, sodium dodecyinaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of nonionic surfactants include, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, mixtures thereof, and the like. In addition, for example, commercially available surfactants from Rhone-Poulenc such as IGEPAL CA-210™, IGEPAL CA-520™, IGEPAL CA720™, IGEPAL CO-890™, IGEPAL CO720™, IGEPAL CO290™, IGEPAL CA210™, ANTAROX 890™ and ANTAROX 897™ may be selected.

Examples of cationic surfactants include, for example, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and C12, C15, C17 trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, and the like, and mixtures thereof. The choice of particular surfactants or combinations thereof as well as the amounts of each to be used are within the purview of those skilled in the art.

Initiators

In forming the latex resin, an initiator may be included to initiate the polymerization process. Any suitable initiator or mixture of initiators may be selected in the latex process and the toner process. The initiator is selected from known free radical polymerization initiators. The free radical initiator can be any free radical polymerization initiator capable of initiating a free radical polymerization process and mixtures thereof, such free radical initiator being capable of providing free radical species on heating to above about 30° C.

Although, generally, water soluble free radical initiators are used in emulsion polymerization reactions, other free radical initiators also can be used. Examples of free radical initiators include, peroxides, such as, ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, diisopropyl peroxycarbonate, tetralin hydroperoxide, 1-phenyl-2-methylpropyl-1-hydroperoxide and tert-butylhydroperoxide; pertriphenylacetate, tert-butyl performate; tert-butyl peracetate; tert-butyl perbenzoate; tert-butyl perphenylacetate; tert-butyl permethoxyacetate; tert-butyl per-N-(3-toluyl)carbamate; sodium persulfate; potassium persulfate, azo compounds, such as, 2,2'-azobispropane, 2,2'-dichloro-2,2'-azobispropane, 1,1'-azo(methylethyl)diacetate, 2,2'-azobis(2-amidinopropane)hydrochloride, 2,2'-azobis(2-amidinopropane)-nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, 1,1'-azobis(sodium 1-methylbutyronitrile-3-sulfonate), 2-(4-methylphenylazo)-2-methylmalonodinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptanenitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1'-azobis-1,2-diphenylethane, poly(bisphenol A-4,4'-azobis-4-cyanopentano-ate) and poly(tetraethylene glycol-2,2'-azobisisobutyrate); 1,4-bis(pentaethylene)-2-tetrazene; 1,4-dimethoxycarbonyl-1,4-dipheny-1-2-tetrazene, ammonium persulfate, hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, sodium persulfate, potassium persulfate, diisopropyl peroxycarbonate and the like; and mixtures thereof.

Based on total weight of the monomers to be polymerized, the initiator may be present in an amount from about 0.1% to about 5%, from about 0.4% to about 4%, from about 0.5% to about 3%, although may be present in greater or lesser amounts.

Chain Transfer Agent

A chain transfer agent optionally may be used to control the polymerization degree of the latex, and thereby control the molecular weight and molecular weight distribution of the product latexes. As can be appreciated, a chain transfer agent can become part of the latex polymer.

The chain transfer agent may have a carbon-sulfur covalent bond. The carbon-sulfur covalent bond has an absorption peak in a wave number region ranging from 500 to 800 cm$^{-1}$ in an infrared absorption spectrum. When the chain transfer agent is incorporated into the latex and the toner made from the latex, the absorption peak may be changed, for example, to a wave number region of 400 to 4,000 cm$^{-1}$.

Chain transfer agents include, for example, n-$C_{3-15}$ alkylmercaptans, for example, n-propylmercaptan, n-butylmercaptan, n-amylmercaptan, n-hexylmercaptan, n-heptylmercaptan, n-octylmercaptan, n-nonylmercaptan, n-decylmercaptan and n-dodecylmercaptan; branched alkylmercaptans, for example, isopropylmercaptan, isobutylmercaptan, s-butylmercaptan, tert-butylmercaptan, cyclohexylmercaptan, tert-hexadecylmercaptan, tert-laurylmercaptan, tert-nonylmercaptan, tert-octylmercaptan and tert-tetradecylmercaptan; aromatic ring-containing mercaptans, for example, allylmercaptan, 3-phenylpropylmercaptan, phenylmercaptan and mercaptotriphenylmethane; and so on, dodecanethiol, butanethiol, isooctyl-3-mercaptopropionate, 2-methyl-5-t-butyl-thiophenol, carbon tetrachloride, carbon tetrabromide and the like. The terms mercaptan and thiol may be used interchangeably to mean a C-SH group.

Based on total weight of the monomers to be polymerized, the chain transfer agent may be present in an amount from about 0.1% to about 7%, from about 0.5% to about 6%, from about 1.0% to about 5%, although may be present in greater or lesser amounts.

A branching agent optionally may be included in the first/second monomer composition to control the branching structure of the target latex. Branching agents include, for example, decanediol diacrylate (ADOD), trimethylolpropane, pentaerythritol, trimellitic acid, pyromellitic acid and mixtures thereof.

Based on total weight of the monomers to be polymerized, the branching agent may be present in an amount from about 0% to about 2%, from about 0.05% to about 1.0%, from about 0.1% to about 0.8%, although may be present in greater or lesser amounts.

The emulsification to form the latex may be done by any suitable process, such as, mixing at elevated temperature. For example, the emulsion mixture may be mixed in a homogenizer set at about 200 to about 400 rpm and at a temperature of from about 40° C. to about 80° C. for a period of from about 1 min to about 20 min.

Any conventional process may be used to form the latex, for example, as described in U.S. Pat. Nos. 5,622,806; 5,869,216; 6,756,176; 6,780,559; 7,097,954; 7,320,851; 7,799,502; 8,227,159; and 8,663,886, the disclosures of each are hereby incorporated by reference in their entirety.

Following completion of the monomer addition, the latex may be permitted to stabilize by maintaining the conditions for a period of time, for example for about 10 to about 300 min, before cooling. Optionally, the latex formed by the above process may be isolated by standard methods, for example, coagulation, dissolution and precipitation, filtering, washing, drying or the like.

After formation of the latex, the latex may be aggregated by the method described herein, and then subjected to coalescence to form toners, inks and developers. The latex of the present disclosure may be melt blended or otherwise mixed with various toner ingredients, such as, a wax dispersion, a coagulant, an optional silica, an optional charge enhancing additive or charge control additive, an optional surfactant, an optional emulsifier, an optional flow additive and the like. Optionally, the latex (for example, around 40% solids) may be diluted to the desired solids loading (for example, about 12 to about 15% by weight solids), before formulated in a toner composition.

Based on the total toner weight, the latex may be present in an amount from about 50% to about 100%, from about 60% to about 98%, from about 70% to about 95%, although may be present in greater or lesser amounts. Methods of producing such latex resins may be carried out as described in the disclosure of U.S. Pat. No. 7,524,602, herein incorporated by reference in its entirety.

Colorants

As the colorant to be added, various known suitable colorants, such as dyes, pigments, mixtures of dyes, mixtures of pigments, mixtures of dyes and pigments, and the like, may be included in the toner. The colorant may be included in the toner in an amount of, for example, about 0.1 to about 35 percent by weight of the toner, or from about 1 to about 15 weight percent of the toner, or from about 3 to about 10 percent by weight of the toner.

As examples of suitable colorants, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP604™, NP608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Waxes

In addition to the latex and colorant, the toners of the present disclosure also optionally contain a wax, which can be either a single type of wax or a mixture of two or more different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

Examples of waxes include, for example, submicron wax particles in the size range of from about 50 to about 500 nanometers, in embodiments of from about 100 to about 400 nanometers in volume average diameter, suspended in an aqueous phase of water and an ionic surfactant, nonionic surfactant, or mixtures thereof. The ionic surfactant or non-ionic surfactant may be present in an amount of from about 0.5 to about 10 percent by weight, and in embodiments of from about 1 to about 5 percent by weight of the wax.

Additional waxes include, for example, a natural vegetable wax, natural animal wax, mineral wax and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and mixtures thereof.

Examples of polypropylene and polyethylene waxes include those commercially available from Allied Chemical and Baker Petrolite, wax emulsions available from Michelman Inc. and the Daniels Products Company, EPOLENE N-15 commercially available from Eastman Chemical Products, Inc., Viscol 550-P, a low weight average molecular weight polypropylene available from Sanyo Kasel K.K., and similar materials. In embodiments, commercially available polyethylene waxes possess a molecular weight (Mw) of from about 1,000 to about 1,500, and in embodiments of from about 1,250 to about 1,400, while the commercially available polypropylene waxes have a molecular weight of from about 4,000 to about 5,000, and in embodiments of from about 4,250 to about 4,750.

The waxes may also be functionalized. Examples of groups added to functionalize waxes include, for example amines, amides, imides, esters, quaternary amines, and/or carboxylic acids. The functionalized waxes may be acrylic polymer emulsions, for example, Joncryl 74, 89, 130, 537, and 538, all available from Johnson Diversey, Inc., or chlorinated polypropylenes and polyethylenes commercially available from Allied Chemical and Petrolite Corporation and Johnson Diversey, Inc.

The wax may be present in an amount of from about 1 to about 30 percent by weight, and in embodiments from about 2 to about 20 percent by weight of the toner.

Buffers

A buffer may also be added to the slurry that is to be continually supplied to the at least one reactor. The buffer may include at least one of acids, salts, bases, organic compounds, and combinations thereof in a solution with deionized water as the solvent.

Examples of acids that may be utilized to form the buffer include, organic and/or inorganic acids such as acetic acid, citric acid, hydrochloric acid, boric acid, formic acid, oxalic acid, phthalic acid, salicylic acid, combinations thereof, and the like.

Examples of salts or bases that may be utilized to form the buffer system include, metallic salts of aliphatic acids or aromatic acids and bases, such as sodium hydroxide (NaOH), sodium tetraborate, potassium acetate, zinc acetate, sodium dihydrogen phosphate, disodium hydrogen phosphate, potassium formate, potassium hydroxide, sodium oxalate, sodium phthalate, potassium salicylate, acetic acid, citric acid, formic acid, oxalic acid, phthalic acid, salicylic acid, combinations thereof, and the like, sodium acetate, sodium acetate trihydrate, potassium acetate, zinc acetate, sodium hydrogen phosphate, potassium formate, sodium oxalate, sodium phthalate, potassium salicylate, and the like, and combinations thereof.

Examples of organic compounds that may be utilized to form the buffer system include, for example, tris(hydroxymethyl)aminomethane (TRIS), Tricine, Bicine, Glycine, HEPES, Triethylamine hydrochloride, 3-(N-morpholino)propanesulfonic acid (MOPS), combinations thereof, and the like.

The amount and combination of buffers utilized as the buffer, as well as deionized water utilized in forming a buffer solution, may vary depending upon the buffer or combination of buffers used and the composition of the toner particles. For example, as discussed above, a buffer may include a combination of both an acid and an organic compound. In such a case, the amount of acid in the combination of buffers may be, for example, from about 1% to about 40% by weight of the total weight of the combination of buffers, such as from about 2% to about 30% by weight. The amount of organic compound in the combination of buffers may be from about 10% to about 50% by weight of the combination of buffers, such as from about 30% to about 40% by weight of the combination of buffers. The amount of acid and/or organic compound in the combination of buffers may be in amounts so that the pH of the combination of buffers is from about 7 to about 12, such as from about 7 to about 9, or from about 8 to about 9, or about 9.

The buffer may be added to the slurry so that the pH of the fully aggregated toner is from about 6 to about 9, such as from about 7 to about 8.

Chelating Agents

A chelating agent may also be added to the slurry during aggregation of the particles. The chelating agent may optionally be added to the inlet of at least one of the reactors connected in a series after the first reactor so that the chelation occurs within the at least one reactor connected in a series after the first reactor. The chelating agent may also be optionally added after the exit of the at least one reactor or exit of the final reactor in a connected series of reactors so that chelation occurs outside of the at least one reactors. The addition of chelating agent after the exit of the slurry from the outlet of the at least one reactor may be carried out by any known method. Chelating agents and their use in forming toners are described, for example, in U.S. Pat. No. 7,037,633, the disclosure of which is hereby incorporated by reference in its entirety. Examples of chelating agents include, chelates based on ammonia, diamine, triamine or tetramine, organic acids such as ethylene diamine tetra acetic acid (EDTA), GLDA (commercially available L-glutamic acid N,N diacetic acid), humic and fulvic acids, peta-acetic and tetra-acetic acids; salts of organic acids including salts of methylglycine diacetic acid (MGDA), and salts of ethylenediamine disuccinic acid (EDDS); esters of organic acids including sodium gluconate, magnesium gluconate, potassium gluconate, potassium and sodium citrate, nitrotriacetate (NTA) salt; substituted pyranones including maltol and ethyl-maltol; water soluble polymers including polyelectrolytes that contain both carboxylic acid (COOH) and hydroxyl (OH) functionalities; and combinations thereof.

The amount of chelating agent added may be from about 0.25 pph to about 4 pph, or from about 0.5 pph to about 2 pph. The chelating agent complexes or chelates with the coagulant metal ion, such as aluminum, thereby extracting the metal ion from the toner aggregate particles. The resulting complex is removed from the particle to lower the amount of retained aluminum in the toner. The amount of metal ion extracted may be varied with the amount of chelating agent, thereby providing controlled crosslinking. For example, adding about 0.5 pph of the chelating agent by weight of toner, may extract from about 40 to about 60 percent of the aluminum ions, while the use of about 1 pph of the sequestering agent may result in the extraction of from about 95 to about 100 percent of the aluminum.

Coagulants

A coagulant, such as a monovalent metal coagulant, a divalent metal coagulant, a polyion coagulant, or the like may also be included in the slurry. As used herein, "polyion coagulant" refers to a coagulant that is a salt or oxide, such as a metal salt or metal oxide, formed from a metal species having a valence of at least 3, and desirably at least 4 or 5. Coagulants include, for example, coagulants based on aluminum such as polyaluminum halides, such as polyaluminum fluoride and polyaluminum chloride (PAC), polyaluminum silicates, such as polyaluminum sulfosilicate (PASS), polyaluminum hydroxide, polyaluminum phosphate, aluminum sulfate, and the like. Other suitable coagulants include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the coagulant is a polyion coagulant, the coagulants may have any desired number of polyion atoms present. For example, suitable polyaluminum compounds in embodiments have from about 2 to about 13, such as from about 3 to about 8, aluminum ions present in the compound The coagulant may be present in the pre-toner particles, exclusive of external additives and on a dry weight basis, in amounts of from 0 to about 5 percent by weight of the pre-toner particles, such as from about greater than 0 to about 3 percent by weight of the pre-toner particles.

As discussed above, the individual components of the slurry to be continuously fed into the reactor may be first mixed and optionally homogenized into a slurry, and the slurry is injected into the reactor. Alternatively, the individual components forming the slurry may be formed into individual dispersions, and the individual dispersions may be simultaneously injected into the reactor and homogenized in the reactor, as described above.

EXAMPLES

For the examples described below, a homogenized slurry was first prepared.
Preparation of Homogenized Slurry 1

Homogenized slurry 1 was prepared by first combining dispersions of latexes, wax, colorant, and de-ionized water to form a premix solution. For 1 L of the premix solution, 136 g of a first amorphous polyester resin dispersion (prepared by the phase inversion emulsification method described in U.S. Pat. No. 7,851,549, the disclosure of which is hereby incorporated by reference in its entirety, with the addition of 2 ppH Dowfax 2A1 and FXC56 resin commercially available from KAO corporation), 131 g of a second amorphous resin dispersion (prepared by phase inversion emulsification by described in U.S. Pat. No. 7,851,549, with the addition of 2 ppH Dowfax 2A1 and FXC42 resin commercially available from KAO corporation), 37.6 g of a crystalline resin dispersion (prepared by the phase inversion emulsification by the method described in U.S. Pat. No. 8,236,471, in the section titled "Preparation of Crystalline Polyester Resin Dispersion Liquid (1)" and using the same resin described therein. The disclosure of U.S. Pat. No. 8,236,471 is hereby incorporated by reference in its entirety), 11.9 g of a cyan pigment dispersion (PB 15:3 from Sun Chemicals), 72.2 g of a carbon black pigment dispersion (NIPEX 35, Evonik Industries, Essen, Del.), 58.1 g of a wax dispersion (Tm=90° C., The International Group, Inc. (IGI)), and 553 g of de-ionized water were combined to give a solids content of about 13.9%. The pH of the premix solution was then adjusted to 4.2 using 0.3 M nitric acid. This premix solution was then homogenized with the addition of 45.0 g of a 2.1% aluminum sulfate solution at room temperature using an inline homogenizer (Kinematica MT-5100). Preparation of Homogenized Slurry 2

Similar to Homogenized Slurry 1, Homogenized Slurry 2 was prepared by first combining dispersions of latexes, wax, colorant, and de-ionized water to form a premix solution. For 1 L of the premix solution, 147 g of a first amorphous polyester resin dispersion (prepared by phase inversion emulsification described in U.S. Pat. No. 7,851,549 with FXC56 resin commercially available from KAO corporation), 142 g of a second amorphous polyester resin dispersion (prepared by phase inversion emulsification method described in U.S. Pat. No. 7,851,549 with FXC42 resin commercially available from KAO corporation), 40.8 g of a crystalline resin dispersion (prepared by the phase inversion emulsification method described in U.S. Pat. No. 8,236,471, in section "Preparation of Crystalline Polyester Resin Dispersion Liquid (1)," using the same resin used therein), 12.9 g of a cyan pigment dispersion (PB 15:3 from Sun Chemicals), 78.3 g of a carbon black pigment dispersion (NIPEX 35, Evonik Industries, Essen, Del.), 63.1 g of a wax dispersion (Tm=90° C., The International Group, Inc. (IGI)), and 516 g of de-ionized water were combined to give a solids content of about 15.1%. The pH of the premix solution was then adjusted to a value of 4.2 using 0.3 M nitric acid. This premix solution was then homogenized with the addition of 48.9 g of a 2.1% aluminum sulfate solution using an inline homogenizer (Kinematica MT-5000).
Preparation of Shell Latex Solution The shell latex solution was prepared by combining latexes and de-ionized water. For 1 L of shell solution, 440 g of a first amorphous polyester resin dispersion (prepared by phase inversion emulsification method described in U.S. Pat. No.

7,851,549 with FXC56 resin commercially available from KAO corporation), 424 g of a second amorphous polyester resin (prepared by the phase inversion emulsification method described in U.S. Pat. No. 7,851,549 with FXC42 resin commercially available from KAO corporation), and 135 g of de-ionized water. The pH of this solution was then adjusted to 3.3 by addition of 0.3 M nitric acid.

Preparation of Toner Particles: Core Aggregation Using Single ARC Reactor

Figure 3:
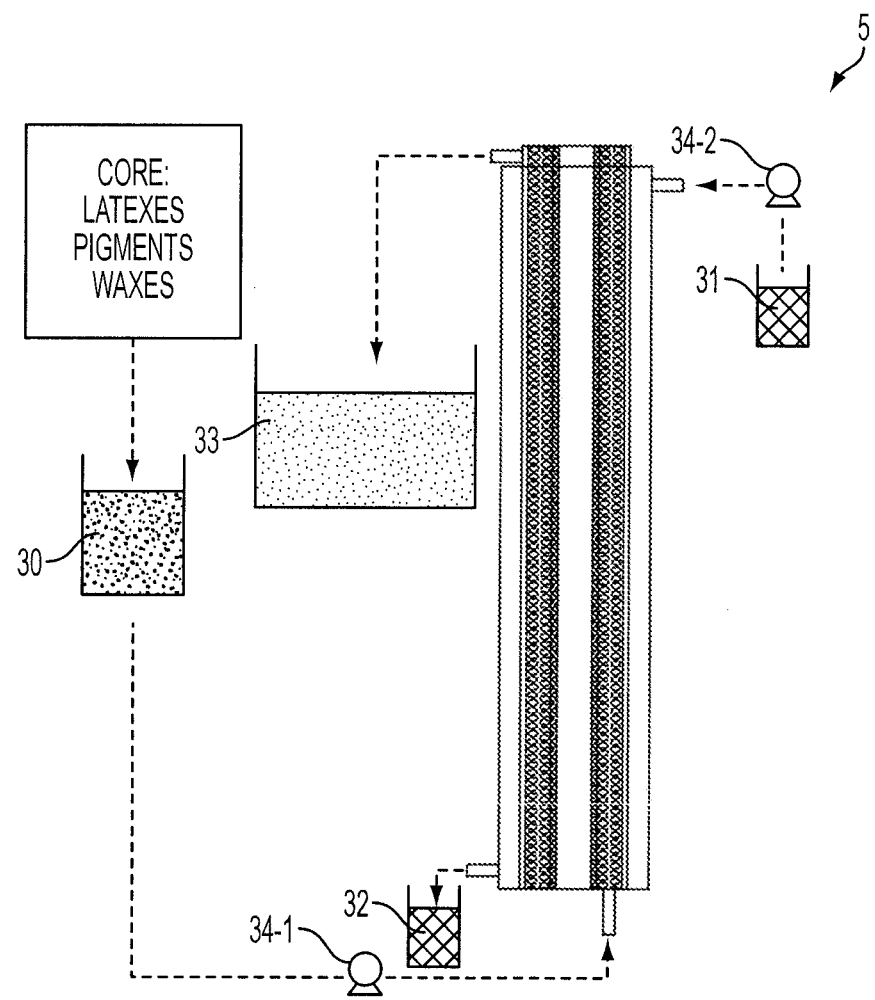
FIG. 3 shows the process flow diagram for core aggregation using a single reactor.

FIG. 3 shows a process flow diagram for core aggregation using a single reactor. The experiments that follow demonstrate that an ARC reactor can produce comparable particle sizes to batch produced particles at the end of core aggregation.

In FIG. 3, the reference numbers represent:

5: reactor

30: slurry holding tank

31: hot liquid

32: expelled hot liquid

33: core-aggregated toner holding tank

34-1, 34-2: metering pumps

Example 1

In this Example, Homogenized Slurry 2 was produced as described above, and stored in a toner slurry tank 30. The toner slurry was fed into the reactor 5 in FIG. 3 at a rate of 202 mL/min. Hot glycol at a temperature of 50° C. was fed into a jacket surrounding the reactor in order to heat the contents of the reactor. The reactor was two feet in length. The inner wall diameter of the reactor was three inches, and the mixing shaft was circular in shape with a one inch diameter. Thus, the diameter of the mixing shaft was about 33% of the diameter of the inner wall of the reactor. The mixing shaft was rotated at a rate of 600 RPM. At the output end of the reactor, the core-aggregated pre-toner particles were collected in a core-aggregated toner holding tank 33. A sample of the core-aggregated pre-toner particles was taken from the holding tank in order to determine the volume-median particle diameter (D50), the volume geometric size distribution (GSDv), and the number geometric size distribution (GSDn) of the pre-toner particles.

A solution of Isotone electrolyte solution and 1M NaOH with a pH of 8 was added to the sample taken from the holding tank. The volume-median particle diameter (D50), the volume geometric size distribution (GSDv), and the number geometric size distribution (GSDn) was then determined using a Beckmann Coulter Multisizer 3. The results are shown in Table 1.

Example 2

Example 2 is the same as Example 1, except that the glycol temperature was 48° C.

Example 3

Example 3 is the same as Example 1, except that the mixing shaft was hexagonal and the toner slurry was fed into the reactor 5 at a rate of 191 mL/min.

Example 4

Example 4 is the same as Example 3 except that the glycol temperature was 53° C.

TABLE 1

| Example | D50 (μM) | GSDv (μM) | GSDn (μM) |
|---|---|---|---|
| Example 1 | 5.42 | 1.25 | 1.26 |
| Example 2 | 4.88 | 1.27 | 1.29 |
| Example 3 | 4.83 | 1.26 | 1.29 |
| Example 4 | 5.04 | 1.23 | 1.27 |

As seen in Table 1, there was not a significant variation in the volume-median particle diameter (D50), the volume geometric size distribution (GSDv), and the number geometric size distribution (GSDn) of the core aggregated particles produced when the shape of the mixing shaft is changed from round (Examples 1 and 2) to hexagonal (Examples 3 and 4), or when and the glycol temperature is varied between 48° C. (Example 2), 50° C. (Examples 1 and 3), and 53° C. (Example 4).

Example 5

In Example 5, Homogenized Slurry 1 was produced as described above, and stored in a toner slurry tank 30. The toner slurry was fed into the reactor 5 of FIG. 3 at a rate of 293 mL/min. Hot glycol at a temperature of 52° C. was fed into a jacket surrounding the reactor in order to heat the contents of the reactor. The reactor was three feet in length. The inner wall diameter of the reactor was three inches, and the mixing shaft was circular in shape with a one inch diameter. Thus, the mixing shaft was about 33% of the diameter of the inner wall of the reactor. The mixing shaft was rotated at a rate of 450 RPM. At the output end of the reactor, the core-aggregated pre-toner particles were collected in a core-aggregated toner holding tank 33. The collected particles were then analyzed to determine the volume-median particle diameter (D50), the volume geometric size distribution (GSDv), and the number geometric size distribution (GSDn) as described in Example 1. The results are shown in Table 2.

Example 6

Example 6 is the same as Example 5, except that the mixing shaft was 1.5 inches in diameter, and the feed rate was 290 mL/min. Thus, the diameter mixing shaft was about 50% of the diameter of the inner wall of the reactor.

Example 7

Example 7 is the same as Example 5, except that the feed rate was 290 mL/min and the glycol temperature was 50° C.

Example 8

Example 8 is the same as Example 7, except that the diameter of the mixing shaft was 1.5 inches. Thus, the diameter of mixing shaft was about 50% of the diameter of the inner wall of the reactor.

TABLE 2

| Example | D50 (μM) | GSDv (μM) | GSDn (μM) |
|---|---|---|---|
| Example 5 | 5.26 | 1.25 | 1.27 |
| Example 6 | 5.31 | 1.23 | 1.29 |

TABLE 2-continued

| Example | D50 (μM) | GSDv (μM) | GSDn (μM) |
|---|---|---|---|
| Example 7 | 5.15 | 1.23 | 1.29 |
| Example 8 | 5.26 | 1.20 | 1.29 |

As shown in Table 2, when the diameter of the mixing shaft ranges from about 33% (Examples 5 and 7) to about 50% (Examples 6 and 8) of the diameter of the inner wall of the reactor, no significant variation in the volume-median particle diameter (D50), the volume geometric size distribution (GSDv), and the number geometric size distribution (GSDn) was observed. Additionally, when comparing the results shown in Table 1 to the results shown in Table 2, when the rotational speed of the mixing shaft is varied between 450 RPM (Examples 5-8) and 600 RPM (Examples 1-4), no significant variation in the volume-median particle diameter (D50), the volume geometric size distribution (GSDv), and the number geometric size distribution (GSDn) was observed.

Preparation of Toner Particles: Core and Shell Aggregation Using Single ARC Reactor FIG. 4 shows a schematic of a core and shell aggregation experiment using two ARC reactors.

Figure 4:
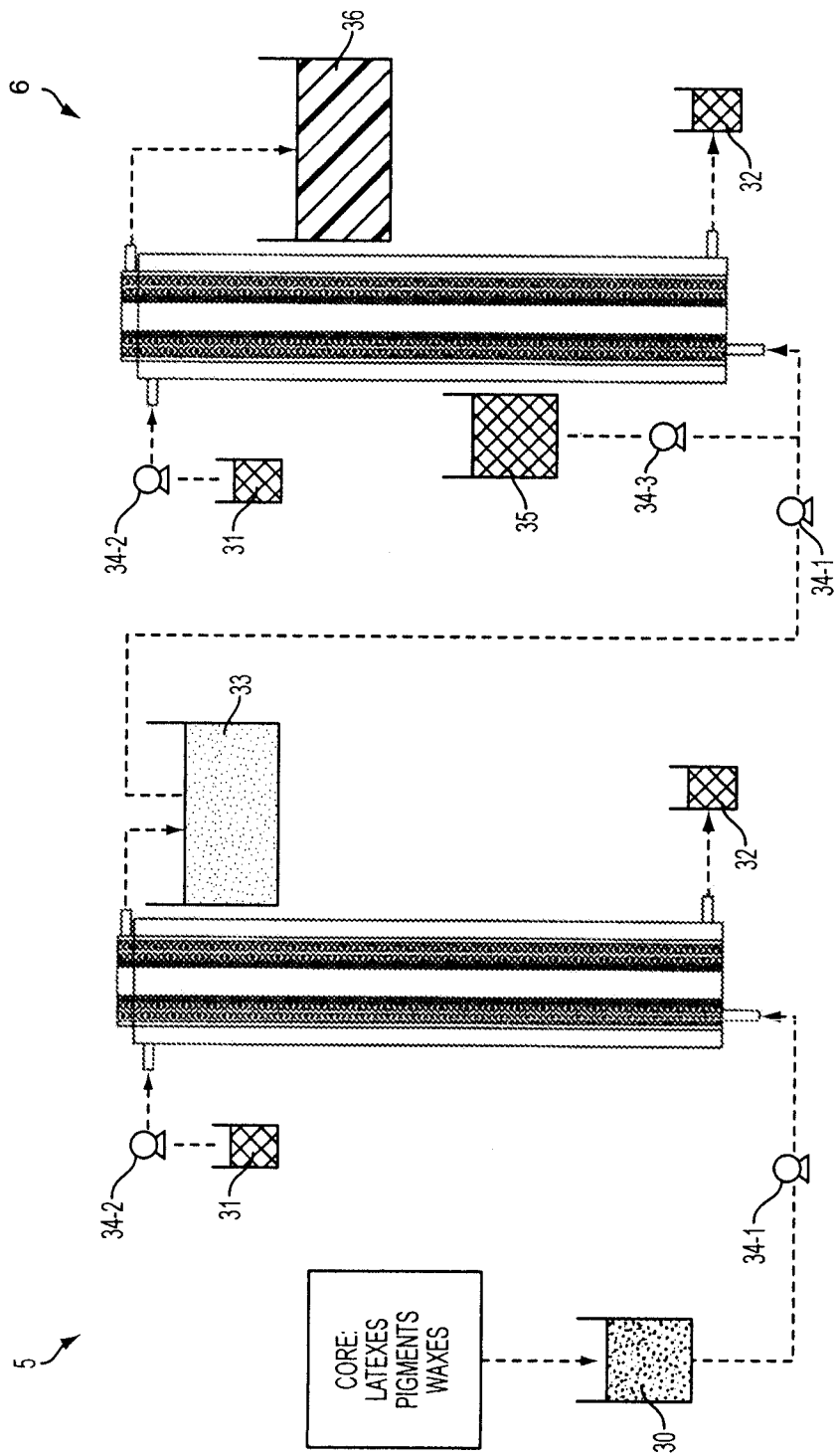
FIG. 4 shows a schematic of a semi-continuous core and shell aggregation experiment using a single ARC reactor. Individually, the core and shell aggregation steps presented in FIG. 4 are continuous yet the carrying out of both continuous experiments using a single reactor would lead to a semi-continuous process, overall.

In FIG. 4, in addition to the reference numbers above, the reference numbers further represent:
- 6: second reactor
- 35: shell storage tank
- 36: pre-toner particle collection tank
- 34-3: metering pump Two ARCs were used in the Examples described below, for example, as shown in FIG. 4. The first reactor was used to aggregate the core of the pre-toner particles. The second reactor was used to add a shell to the core-aggregated particles. The core-aggregated slurry was collected from the reactor after aggregation and stored in core-aggregated toner holding tank 33, as described above. After the core aggregated slurry was collected in the core-aggregated toner holding tank 33, the core-aggregated slurry was pumped from the core-aggregated toner holding tank 33 into the second reactor 6. A shell latex was simultaneously fed into the second reactor 6 from shell storage tank 35.

Example 9

In Example 9, Homogenized Slurry 1 was produced as described above, and stored in a toner slurry tank 30. The homogenized slurry was fed into the reactor 5 at a rate of 304 mL/min. Hot glycol at a temperature of 50° C. was fed into a jacket surrounding the reactor in order to heat the contents of the reactor. The reactor was three feet in length. The inner wall diameter of the reactor was three inches, and the mixing shaft was circular with a one inch diameter. Thus, the diameter of the mixing shaft was about 33% of the diameter of the inner wall of the reactor. The mixing shaft was two feet in length. The mixing shaft was rotated at a rate of 450 RPM. At the output end of the reactor, the core-aggregated pre-toner particles were collected in a core-aggregated toner holding tank 33.

A sample was obtained from the core-aggregated toner holding tank to analyze the volume-median particle diameter (D50), the volume geometric size distribution (GSDv), and the number geometric size distribution (GSDn), as described in Example 1.

After the core aggregated slurry was collected in the core-aggregated toner holding tank, the core-aggregated slurry was pumped from the core-aggregated toner holding tank into the second reactor. Additionally, the shell latex was simultaneously fed into reactor from shell storage tank. The total feed rate of the core-aggregated particles and the shell latex into the second reactor was 354 mL/min. Hot glycol at a temperature of 50° C. was fed into a jacket surrounding the reactor in order to heat the contents of the reactor. The second reactor was two feet in length, and inner wall diameter was three inches. The diameter of the mixing shaft was one inch, and the mixing shaft was rotated at 450 RPM. Thus, the diameter of the mixing shaft was about 33% of the diameter of the inner wall of the second reactor. The pre-toner particles were collected in pre-toner particle collection tank 36. A sample was taken from the pre-toner particle collection tank 36 and analyzed to determine the volume-median particle diameter (D50), the volume geometric size distribution (GSDv), and the number geometric size distribution (GSDn), as described in Example 1. The results are shown in Table 3.

Example 10

Example 10 is the same as Example 9, except that the homogenized slurry was fed into the reactor 5 at a rate of 289 mL/min, the glycol temperature was 48° C., and the mixing shaft was 1.5 inches. Thus, the diameter of the mixing shaft was about 50% of the diameter of the inner wall of the first reactor.

For the addition of the shell latex, Example 10 is the same as Example 9, except that the total feed rate of the core-aggregated particles and the shell latex into the second reactor was 340 mL/min, and the glycol temperature was 48° C.

Example 11

Example 11 is the same as Example 10, except that the homogenized slurry was fed into the reactor 5 at a rate of 215 mL/min. The addition of the shell latex is the same as Example 10, except that the total feed rate of the core-aggregated particles and the shell latex into the second reactor was 260 mL/min, and the mixing shaft was rotated at 300 RPM.

Example 12

Example 12 is the same as Example 11, except that the glycol temperature for the first and second reactors was 50° C.

TABLE 3

| Example | | D50 (μM) | GSDv (μM) | GSDn (μM) |
|---|---|---|---|---|
| Example 9 | Core | 5.09 | 1.22 | 1.30 |
| | Shell | 5.37 | 1.20 | 1.25 |
| Example 10 | Core | 5.04 | 1.22 | 1.29 |
| | Shell | 5.37 | 1.21 | 1.26 |
| Example 11 | Core | 5.42 | 1.23 | 1.30 |
| | Shell | 5.65 | 1.20 | 1.27 |
| Example 12 | Core | 5.54 | 1.23 | 1.26 |
| | Shell | 5.90 | 1.18 | 1.25 |

As demonstrated in Table 3, no significant variation in the volume-median particle diameter (D50), the volume geometric size distribution (GSDv), and the number geometric size distribution (GSDn) was observed in the sample taken from the core-aggregated holding tank 33, thus the holding tank did not artificially improve the resulting particle size. Therefore, Examples 10-12 accurately reflect what would have been observed with a fully continuous series of discrete ARCs. In addition, when the diameter of the mixing shaft ranges from about 33% (Example) 9 to about 50% (Examples 10-12) of the diameter of the inner wall of the reactor, no significant variation in the volume-median particle diameter (D50), the volume geometric size distribution (GSDv), and the number geometric size distribution (GSDn) was observed. Additionally, when the rotational speed of the mixing shaft varies between 300 RPM (Examples 11 and 12) and 450 RPM (Examples 9 and 10), or when the glycol temperature is varied between 48° C. (Examples 10 and 11) and 50° C. (Examples 9 and 12), no significant variation in volume-median particle diameter (D50), the volume geometric size distribution (GSDv), and the number geometric size distribution (GSDn) was observed.

Preparation of Toner Particles: Core Aggregation Using Two ARCs in Series

In the Example described below, two ARCs were connected in series for core aggregation. In other words, the output end of the first ARC was in fluid connection to the input end of the second ARC.

Example 13

In Example 13, Homogenized Slurry 1 was produced as described above, and stored in a toner slurry tank. The toner slurry was fed into the first reactor at a rate of 480 mL/min. Thus, the total feed rate into the second reactor was also 480 mL/min. Hot glycol at a temperature of 50° C. was fed into the jackets surrounding each of the reactors in order to heat the contents of the reactors. The first reactor was three feet in length and the second reactor was two feet in length. The inner wall diameter of each reactor was three inches, and the mixing shaft of each reactor were circular with a one inch diameter. Thus, the mixing shaft was about 33% of the diameter of the inner wall of the reactor. The mixing shafts were each rotated at a rate of 450 RPM. At the output end of the second reactor, the core-aggregated pre-toner particles were collected in a core-aggregated toner holding tank, and a sample was obtained as described in Example 1. The collected particles were then analyzed to determine the volume-median particle diameter (D50), the volume geometric size distribution (GSDv), and the number geometric size distribution (GSDn), according to Example 1. The results are shown in Table 4.

TABLE 4

| Example | D50 (μM) | GSDv (μM) | GSDn (μM) |
| --- | --- | --- | --- |
| Example 13 | 4.73 | 1.23 | 1.28 |

The results in Table 4 demonstrate that, when compared to the results in Tables 1-3, no significant variation in the volume-median particle diameter (D50), the volume geometric size distribution (GSDv), and the number geometric size distribution (GSDn) was observed when the reactors are connected in series.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for the continuous aggregation of pre-toner particles, the method comprising:
continuously flowing a slurry that comprises at least one component that includes at least one resin, and optionally further includes at least one wax, at least one colorant, at least one buffer, at least one chelating agent, at least one coagulant, and/or at least one surfactant, or continuously flowing individual dispersions of the components of the slurry, into at least a first reactor comprising:
a cylinder,
wherein the cylinder has a cylindrical channel, wherein
the cylindrical channel has an inner wall;
a mixing shaft located in the cylindrical channel, wherein
a longitudinal axis of the mixing shaft is substantially parallel to a longitudinal axis of the cylinder; and
at least one blade attached directly to the mixing shaft, wherein
the at least one blade has a plurality of holes, and
continuously mixing the slurry or the individual dispersions of the components of the slurry, in the reactor to form aggregated pre-toner particles; and
continuously collecting the aggregated pre-toner particles.

2. The method of claim 1, wherein the aggregated pre-toner particles have a GSDn is in the range of about 1.15 to about 1.5.

3. The method of claim 1, wherein the after the aggregated pre-toner particles are formed, the aggregated pre-toner particles are subjected to at least one further processing step selected from the group consisting of freezing particle aggregation, chelation, coalescence, washing, drying, and toner blending in order to form toner particles.

4. The method of claim 1, wherein a length aspect ratio (length/diameter) of the reactor is from about 5 to about 50.

5. The method of claim 1, wherein a $D_{50}$ average particle size of the aggregated pre-toner particles exiting the at least one reactor is from about 1 to about 1000 times larger than a $D_{50}$ average particle size of the slurry, or the individual dispersions of the components of the slurry, entering the reactor.

6. The method of claim 1, wherein a space-time yield of the continuous aggregation method is about 0.1 g/L/hr to about 3,000 g/L/hr.

7. The method of claim 1, wherein the diameter or width the mixing shaft is about 5% to about 95% of the diameter of the inner wall.

8. The method of claim 1, wherein the mixing shaft has an eccentric axis of rotation relative to a centerline axis of the inner wall, or the mixing shaft is located at the center of the cylindrical channel.

9. A process for the continuous production of emulsion aggregated pre-toner particles, the process comprising:
continuously feeding a slurry comprising at least one resin into at least one agitated plug-flow reactor comprising at least one entry point, at least one exit point, and an impeller comprising at least one perforated blade;
continuously aggregating the slurry in the at least one agitated plug-flow reactor to form aggregated particles; and
continuously withdrawing from the at least one exit point of the at least one agitated plug-flow reactor a stream that comprises the aggregated particles, wherein
the average particle size of the aggregated particles is about one to about four orders of magnitude greater than the average particle size of the feed dispersion.

10. The method of claim 9, wherein the slurry is a homogenous slurry, and further comprises at least one wax, at least one colorant, at least one buffer, at least one chelating agent, at least one coagulant, and/or at least one surfactant.

11. The method of claim 9, wherein the slurry is a nonhomogeneous slurry, and further comprises at least one wax, at least one colorant, at least one buffer, at least one chelating agent, at least one coagulant, and/or at least one surfactant.

12. The method of claim 9, wherein a space-time yield of the process ranges from about 0.1 g/L/hr to about 3,000 g/L/hr.

13. The method of claim 9, wherein a residence time of the mixture in the at least one reactor is from about 2 to about 60 minutes.

14. The method of claim 9, wherein the aggregation of the slurry occurs in one rector.

15. A method for the continuous aggregation of pre-toner particles, the method comprising:
continuously flowing a slurry that comprises at least one component that includes at least one resin, or continuously flowing individual dispersions of the components of the slurry, into at an input end of least one reactor comprising:
a hollow tube, wherein
the hollow tube has a cylindrical inner wall;
a length of the tube is greater than a diameter of the tube;
a mixing shaft, wherein
the mixing shaft is concentric with the hollow tube,
a longitudinal axis of the mixing shaft is parallel to a longitudinal axis of the hollow tube, and
the mixing shaft is rotatable about the longitudinal axis of the mixing shaft,
a least one perforated blade, wherein
the at least one perforated blade is attached to the mixing shaft, and
the at least one perforated blade extends radially from the mixing shaft toward the inner wall of the tube,
continuously rotating the mixing shaft in the at least one reactor to continuously at least partially aggregate the mixture into at least partially aggregated pre-toner particles; and
continuously flowing the at least partially aggregated pre-toner particles out of the at least one reactor through an output end of the at least one reactor.

16. The method of 15, wherein the at least one reactor comprises at least a first and second reactor, wherein the output end of the first reactor is in fluid connection with an input end of the second reactor, and the slurry or the individual dispersions are partially aggregated in the first reactor, and the method further comprises:
continuously flowing the partially aggregated pre-toner particles out of the output end of the first reactor and into the input end of the second reactor;
continuously further aggregating the partially aggregated pre-toner particles in the second reactor into further aggregated pre-toner particles, and
continuously flowing the further aggregated pre-toner particles out of the second reactor through an output end of the second reactor.

17. The method of claim 15, wherein the mixing shaft in the first reactor and in the second reactor are rotated at different speeds.

18. The method of 15, wherein the at least the partially aggregated pre-toner particles are further aggregated in a series of continuously-stirred-tank-reactors or in batch reactor.

19. The method recited in claim 15, wherein the at least one reactor comprises at least a first and second reactor, wherein the output end of the first reactor is in fluid connection with an input end of the second reactor, and the method further comprises:
continuously aggregating the slurry, or the individual dispersions of the components of the slurry, into fully aggregated pre-toner particles in the first reactor;
continuously flowing the fully aggregated pre-toner particles out of the at least one reactor through the output end of the at least one reactor and into the input end of the second reactor;
simultaneously continuously flowing a homogenous mixture of shell latex particles into the input end of the second reactor;
mixing the fully aggregated pre-toner particles and the homogenous mixture of shell latex particles to form core-shell pre-toner particles; and
continuously flowing the core-shell pre-toner particles out of the second reactor through an output end of the second reactor.

20. The method recited in claim 15, wherein the at least one reactor comprises at least a first series of reactors to aggregate the slurry, or aggregate the individual dispersions of the components of the slurry, into fully aggregated pre-toner particles, and at least a second series of reactors to apply a latex shell to the fully aggregated pre-toner particles, wherein the method further comprises,
continuously flowing the fully aggregated pre-toner particles from the first series of reactors into the second series of reactors, and
simultaneously continuously flowing a homogenous mixture of shell latex particles into the second series of reactors;
mixing the fully aggregated pre-toner particles and the homogenous mixture of shell latex particles to form core-shell pre-toner particles; and
continuously flowing the core-shell pre-toner particles out of the second series of reactors.

* * * * *